July 31, 1945.  A. A. TUNLEY  2,380,806
ENROBER OR CHOCOLATE COATING MACHINE
Filed June 22, 1943  2 Sheets-Sheet 1

Inventor
A. A. Tunley
By Glascock Downing & Seebold
Attys

July 31, 1945.	A. A. TUNLEY	2,380,806
ENROBER OR CHOCOLATE COATING MACHINE
Filed June 22, 1943	2 Sheets-Sheet 2

Inventor
A. A. Tunley
By Glascock Downing & Sutwee
Attys

Patented July 31, 1945

2,380,806

UNITED STATES PATENT OFFICE 2,380,806

ENROBER OR CHOCOLATE COATING MACHINE

Allan Ashmead Tunley, Peterborough, England, assignor to Baker Perkins Limited, Peterborough, Northampton, England Application June 22, 1943, Serial No. 491,849
In Great Britain August 5, 1942

5 Claims. (Cl. 91—2)

This invention relates to enrobers or chocolate coating machines and has more particular reference to bottom flow pans for coating the underside of biscuits, chocolate centres, sweetmeats and the like with chocolate. Sieves or screens are sometimes in the bottom flow pans for straining the entering chocolate to separate out any particles of foreign matter such as biscuit crumbs or other debris derived from the goods under treatment. These sieves are fixed or inaccessibly mounted and can only be removed for cleaning or removal of accumulated debris or for repair, with difficulty and their removal may necessitate considerable dismantling of the structure.

An aim of the present invention is to provide a sieving device and pan construction adapted to render the sieve bodily removable from the apparatus so that it can be cleaned or otherwise attended and replaced with the minimum of trouble.

The invention consists in locating an elongated sieve or trough to which the chocolate is supplied, in the bottom flow pan in alignment with the chocolate filler door or aperture of the chocolate tank of the enrober apparatus, and mounting the trough on a slideway so that it may be withdrawn endwise through the door or aperture as required.

Figure 1:
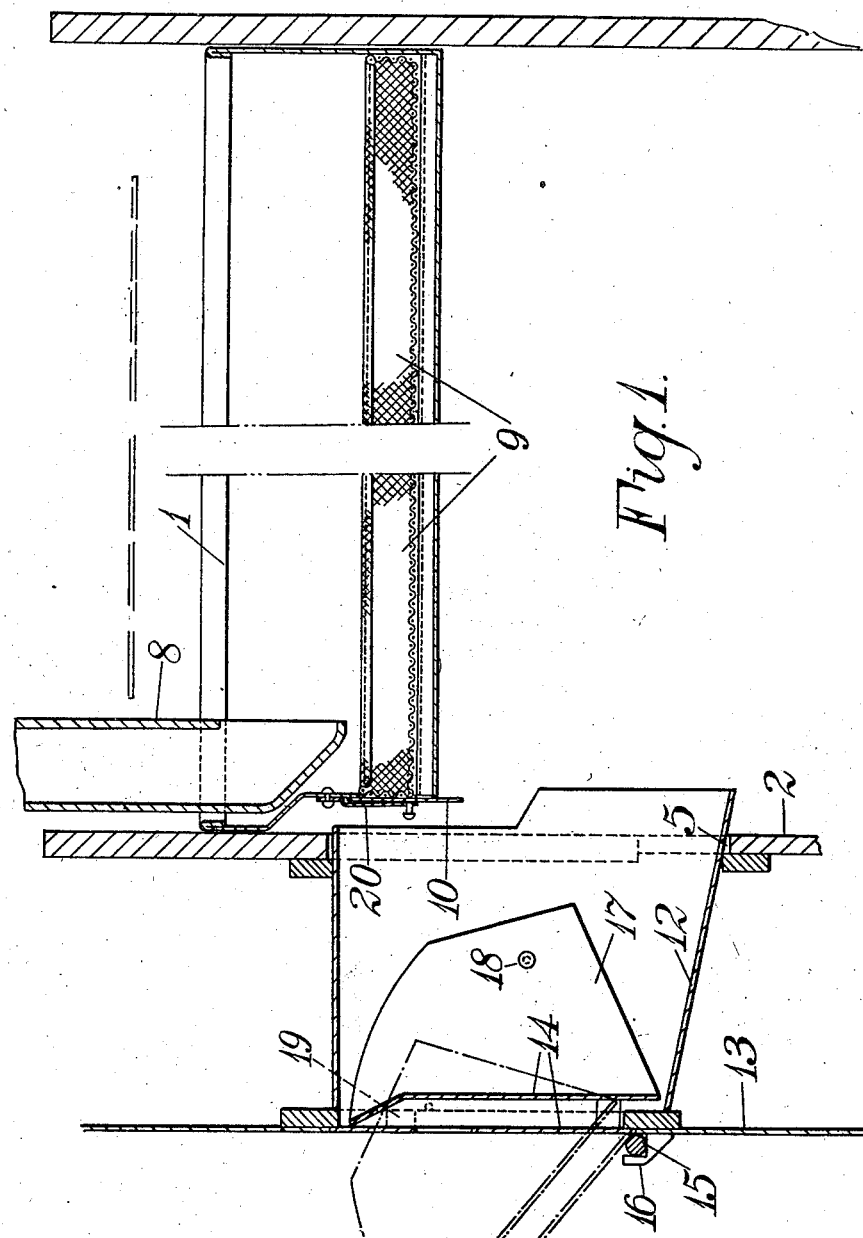
Figure 1 is a cross section showing parts of an enrobing machine together with the bottom flow pan and tank filler door.
Figure 2:
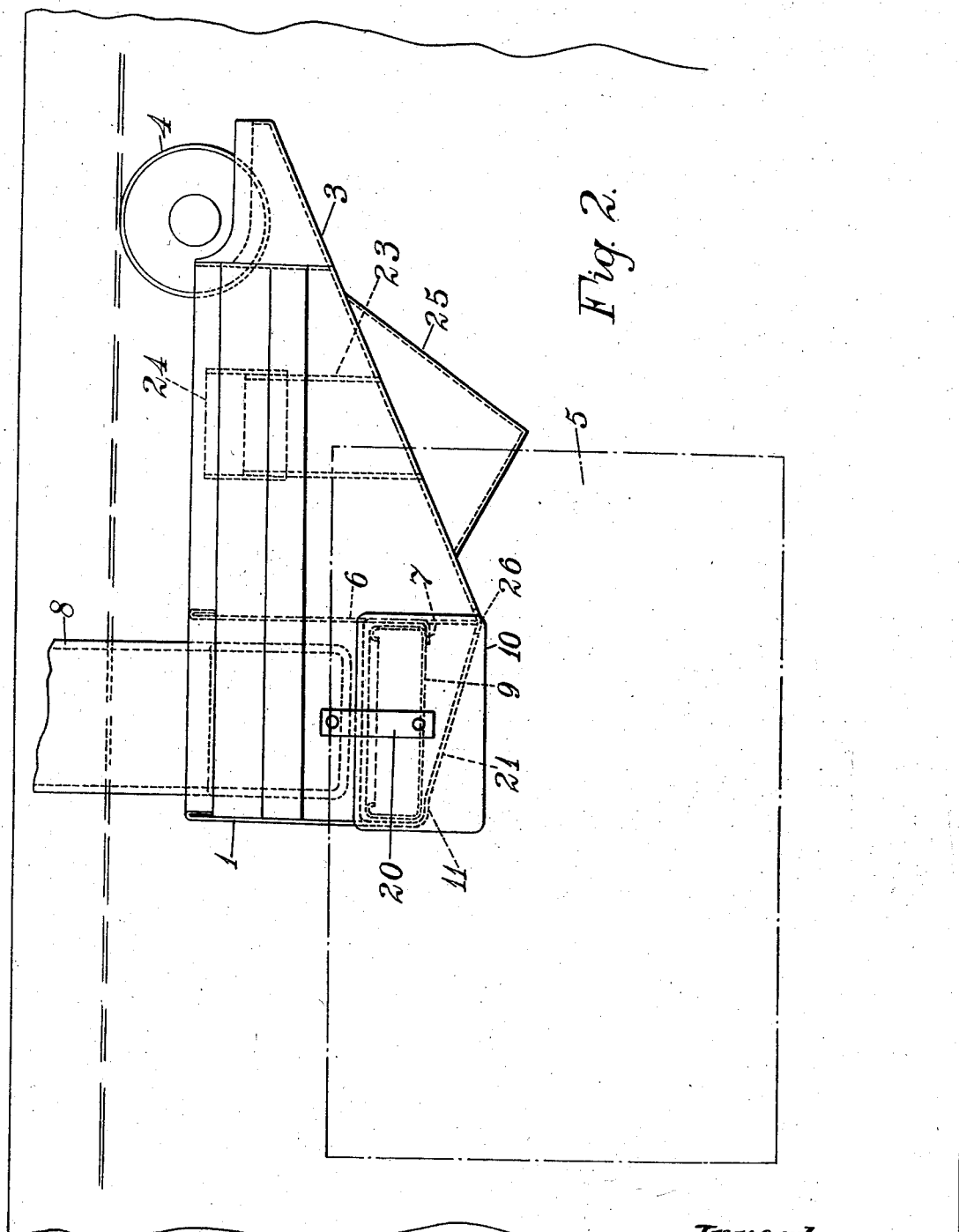
Figure 2 is an end view of the bottom flow pan partly in section.

In carrying the invention into effect according to one mode, as applied by way of example to an enrober having a bottom flow pan 1 mounted above the main chocolate tank 2 and a bottom portion 3 inclined upwardly towards the bottoming roll 4 and in which a chocolate filler door or opening 5 is provided adjacent the side of the bottom flow pan away from the position in which the bottoming roll is located, the bottom flow pan 1 is divided by a vertical partition 6 which extends from one side or end of the pan to the other transversely of the enrober but which terminates short of the bottom of the pan 1 so that the portions of the pan divided by the partition plate 6 are in liquid communication below its lower edge 7. The chocolate entry pipe 8 is located upon one side of the partition 6 and discharges into the sieving device through which the chocolate passes, and under the lower edge 7 of the partition towards the bottoming roll 4.

The lower edge 7 of the partition 6 may be conveniently bent at right-angles to form one slideway of a pair adapted to receive a straining or sieving trough 9. The other slideway of the pair may be constituted by a horizontal ledge 11 formed in the wall of the pan itself opposite to the partition or a flange plate may be secured to the wall to provide the necessary slideway.

The straining trough 9 comprises a metal screen or sieve formed into trough shape and reinforced by a wire or frame at its upper edge. The width of the trough conforms to the width between the partition 6 and the opposite side of the bottom flow pan, sufficient clearance being left to enable the trough readily to be slid endwise upon the slideways 7 and 11. At one end the trough is provided with an end plate 10 adapted to close an aperture in the pan when the trough is in position.

Adjacent the outer end of the trough slideway the aperture or opening 5 for the chocolate filler door device is positioned. This device may comprise a casing or chute 12 fitted to the outer casing 13 of the machine and having a chocolate charging door 14 which is provided with horizontal coaxial trunnions 15 at its lower edge located in open slotted brackets 16 so that the door has a hinging action and may be lifted out, when desired, to afford a clear way through. The door 14 may have side flaps 17 on which stop pegs 18 are located to prevent the normal opening of the door beyond a certain angle. At the sides of the aperture in the outer casing 13 slots 19 are provided through which the stop pegs 18 may be passed when the door 14 is lifted off its brackets 16 for removal. When the door 14 has been removed it will be appreciated that there is clear access to the end of the straining trough 9 so that it may be readily withdrawn endwise through the chocolate filler aperture or opening 5.

To prevent accidental endwise movement of the trough 9 a depending pivoted catch 20 may be provided upon the adjacent end wall of the bottoming pan so that withdrawal or longitudinal displacement of the trough 9 is obstructed until the catch has been swung out of position.

Below the trough 9 the bottom wall 21 of the flow pan may be inclined downwardly to direct the chocolate passing through the sieve under the partition 6 and to the foot of the upward incline towards the bottoming roll 4. In the upwardly inclined portion of the pan an overflow pipe 23, which may have an adjustable lip 24, may be provided which discharges to a gutter 25 for conveying overflowing chocolate to the return circuit.

The entry pipe 8 for chocolate is preferably disposed towards the end of the trough adjacent the chocolate filler chute 12 and the entry of chocolate is directed to flood the sieve longitudinally. The chocolate on entering passes through the straining trough 9, under the partition 6 and rises until it is well above the lower periphery of the bottoming roll 4, the height of the chocolate level being determined by the adjustment of the overflow pipe 23.

The pan is provided with a draining hole 26 providing a constant leak to ensure that no chocolate is left in the pan to solidify when the machine cools down.

I claim:

1. A chocolate coating machine comprising a tank having a chocolate filler opening in a wall thereof, a bottom flow pan located within said tank a rotary bottoming roll located in said tank for raising the coating material and transferring it to the bottom of the goods, a strainer removably mounted in said pan and to which liquid chocolate is supplied in delivering to said pan, said strainer being located in alignment with said opening and removable therethrough.

2. A chocolate coating machine comprising a tank having a chocolate filler opening in a wall thereof, a bottom flow pan located within said tank a rotary bottoming roll located in said tank for raising the coating material and transferring it to the bottom of the goods, said pan having spaced ledges, an elongated strainer removably supported upon said ledges and to which liquid chocolate is supplied in delivering to said pan, said strainer being located in alignment with said opening and removable endwise therethrough.

3. A chocolate coating machine comprising a tank having a chocolate filler opening in a wall thereof, a bottom flow pan located within said tank, said pan having a wall bent to form a supporting ledge, a cross partition spaced from said pan wall, the lower end of said partition being spaced from the bottom of the pan and being bent to form a second supporting ledge, an elongated strainer removably supported on said ledges and to which liquid chocolate is supplied in delivering to said pan, said strainer being located in alignment with said opening and removable endwise therethrough.

4. A chocolate coating machine comprising a tank having a chocolate filler opening in a wall thereof, a bottom flow pan located within said tank, an elongated strainer removably mounted in said pan, a liquid chocolate entry pipe for said pan located toward the end of the strainer adjacent said opening, said pipe having a delivery aperture located to direct liquid chocolate longitudinally of the strainer, said strainer being located in alignment with said opening and removable endwise therethrough.

5. A chocolate coating machine comprising a tank having a filler opening in a wall thereof, a casing enclosing said tank and spaced therefrom, said casing having in its wall adjacent said filler opening an opening in alignment therewith, open brackets secured to said casing adjacent the opening thereof, a door having coaxial trunnions located in said brackets to close said casing opening, a bottom flow pan located in said tank, a strainer removably mounted in said pan and to which liquid chocolate is supplied in delivering to said pan, said strainer being located in alignment with said opening and removable therethrough when said door has been lifted from said brackets.

ALLAN ASHMEAD TUNLEY.